E. F. ESSNER.
MACHINE FOR CUTTING OFF CONDENSER TUBES.
APPLICATION FILED DEC. 31, 1918.

1,328,039.

Patented Jan. 13, 1920.

E. F. ESSNER.
MACHINE FOR CUTTING OFF CONDENSER TUBES.
APPLICATION FILED DEC. 31, 1918.
1,328,039.
Patented Jan. 13, 1920.
4 SHEETS—SHEET 2.
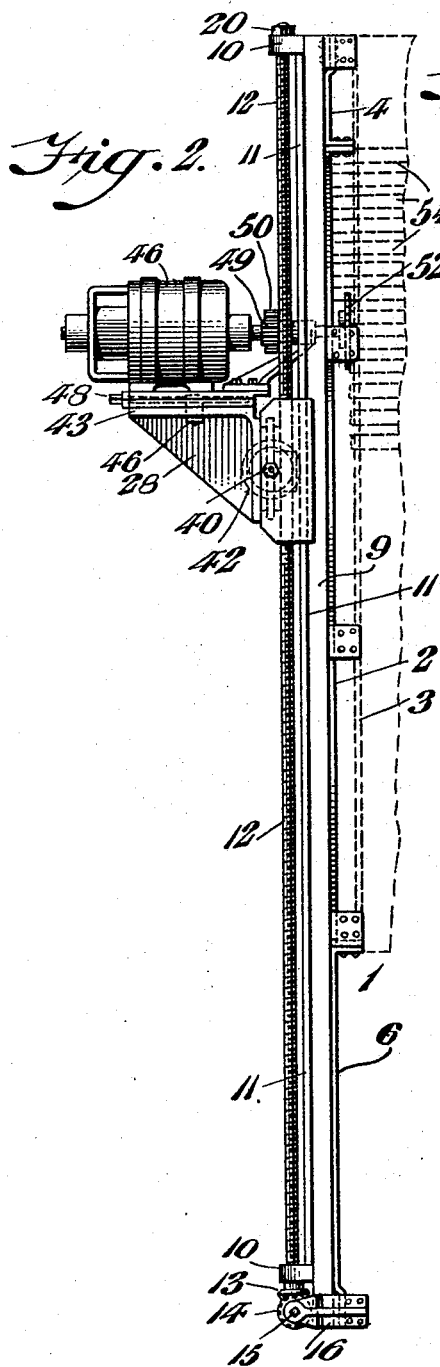
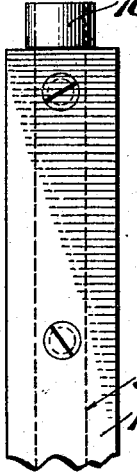
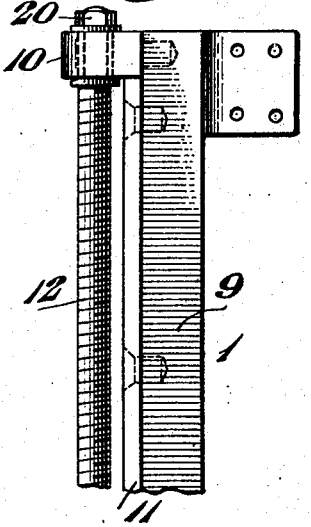
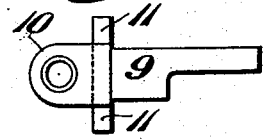
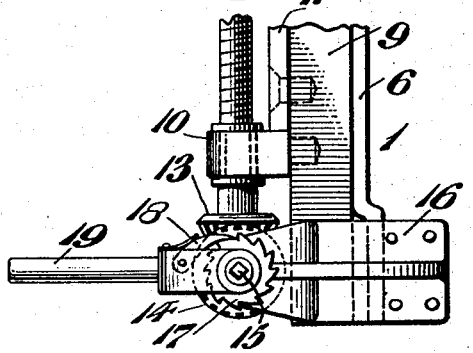

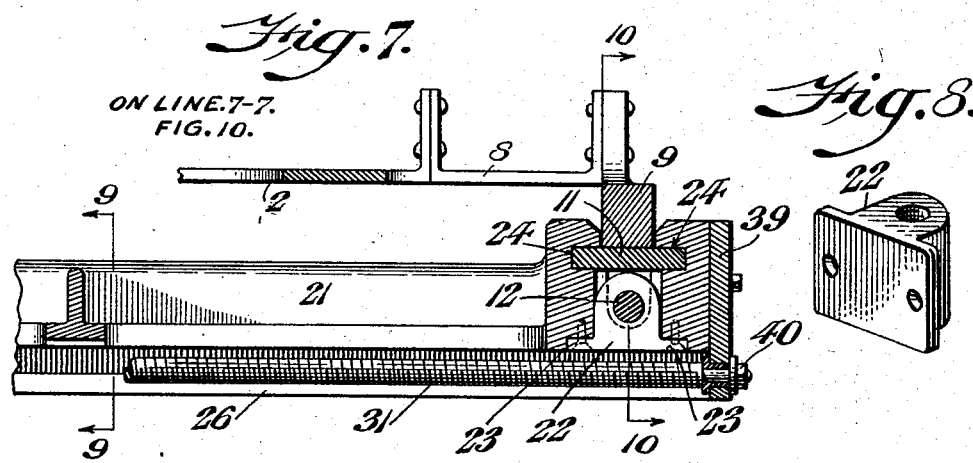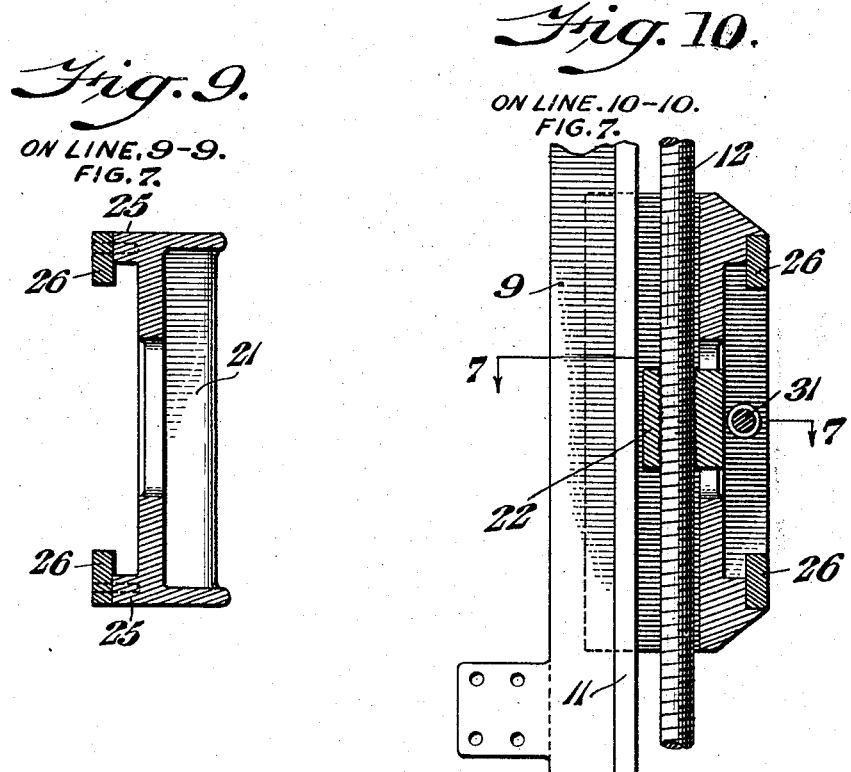

E. F. ESSNER.
MACHINE FOR CUTTING OFF CONDENSER TUBES.
APPLICATION FILED DEC. 31, 1918.
1,328,039.
Patented Jan. 13, 1920.
4 SHEETS—SHEET 4.
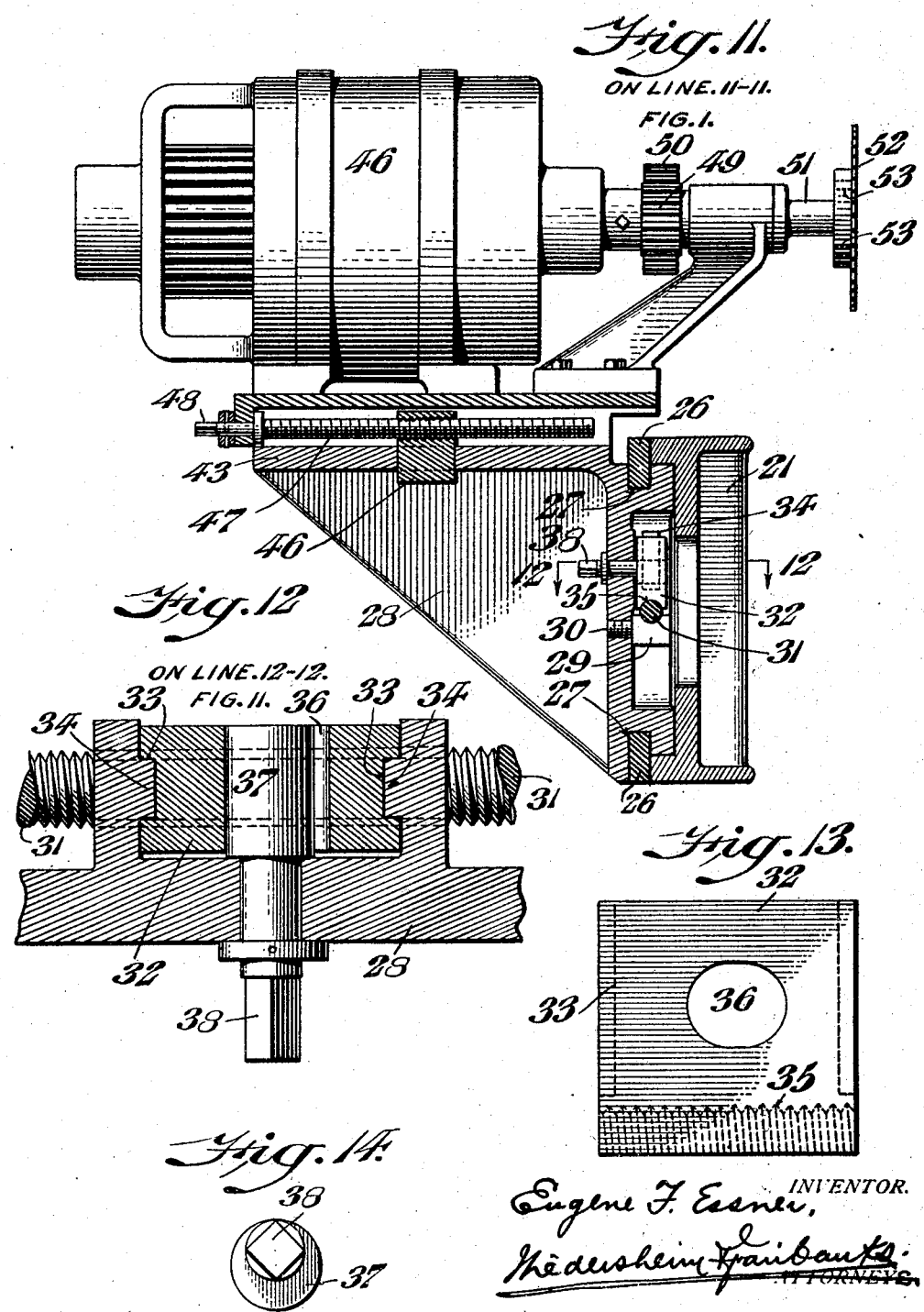

UNITED STATES PATENT OFFICE.

EUGENE FRANCIS ESSNER, OF SAN FRANCISCO, CALIFORNIA, ASSIGNOR TO BETHLEHEM SHIPBUILDING CORPORATION, LTD., OF BETHLEHEM, PENNSYLVANIA, A CORPORATION OF DELAWARE.

MACHINE FOR CUTTING OFF CONDENSER-TUBES.

1,328,039.  Specification of Letters Patent.  Patented Jan. 13, 1920.

Application filed December 31, 1918. Serial No. 269,137.

*To all whom it may concern:*

Be it known that I, EUGENE FRANCIS ESSNER, a citizen of the United States, residing in the city and county of San Francisco, State of California, have invented a new and useful Machine for Cutting Off Condenser-Tubes, of which the following is a specification.

My invention relates to a machine which is especially designed for sawing off condenser tubes to their correct length after they have been placed in the tube sheets.

It further consists of a novel construction of a sawing machine wherein the supporting frame is made of a size suitable for the work to be covered and of a shape adapted to the type of condenser which is to be operated upon.

It further consists of a novel sawing machine wherein the motor is mounted in a novel manner and provision is made for effecting its vertical and lateral adjustment in accordance with the requirements met with in practice.

It further consists of a novel sawing machine wherein the motor is adjustably mounted on a carriage, means being provided for feeding the carriage along the work and for rendering the feeding mechanism inoperative, when the sawing operation is to take place.

Other novel features of construction and advantage will hereinafter more clearly appear in the detailed description of my invention.

For the purpose of illustrating my invention, I have shown in the accompanying drawings embodiments thereof which are at present preferred by me, since said embodiments will be found in practice to give satisfactory and reliable results, although it is to be understood that the various instrumentalities of which my invention consists can be variously arranged and organized and that my invention is not limited to the precise arrangement and organization of these instrumentalities as herein shown and described.

Fig. 2 represents an end elevation of the machine.

Fig. 3 represents in front elevation one of the uprights of the frame.

Fig. 4 represents an elevation of the construction seen in Fig. 3, with the worm shaft in place.

Fig. 5 represents a top plan view of the construction seen in Fig. 3.

Fig. 6 represents an end elevation, showing the means to rotate a worm shaft.

Fig. 7 represents a section on line 7—7 of Fig. 10.

Fig. 8 represents in perspective a nut employed.

Fig. 9 represents a section on line 9—9 of Fig. 7.

Fig. 10 represents a section on line 10—10 of Fig. 7.

Fig. 11 represents, on an enlarged scale, a section on line 11—11 of Fig. 1.

Fig. 12 represents a section on line 12—12 of Fig. 11.

Fig. 13 represents in front elevation the upper part of a sectional nut seen in Fig. 11.

Fig. 14 represents an end view of the eccentric seen in Figs. 11 and 12.

Similar numerals indicate corresponding parts.

Figure 1:
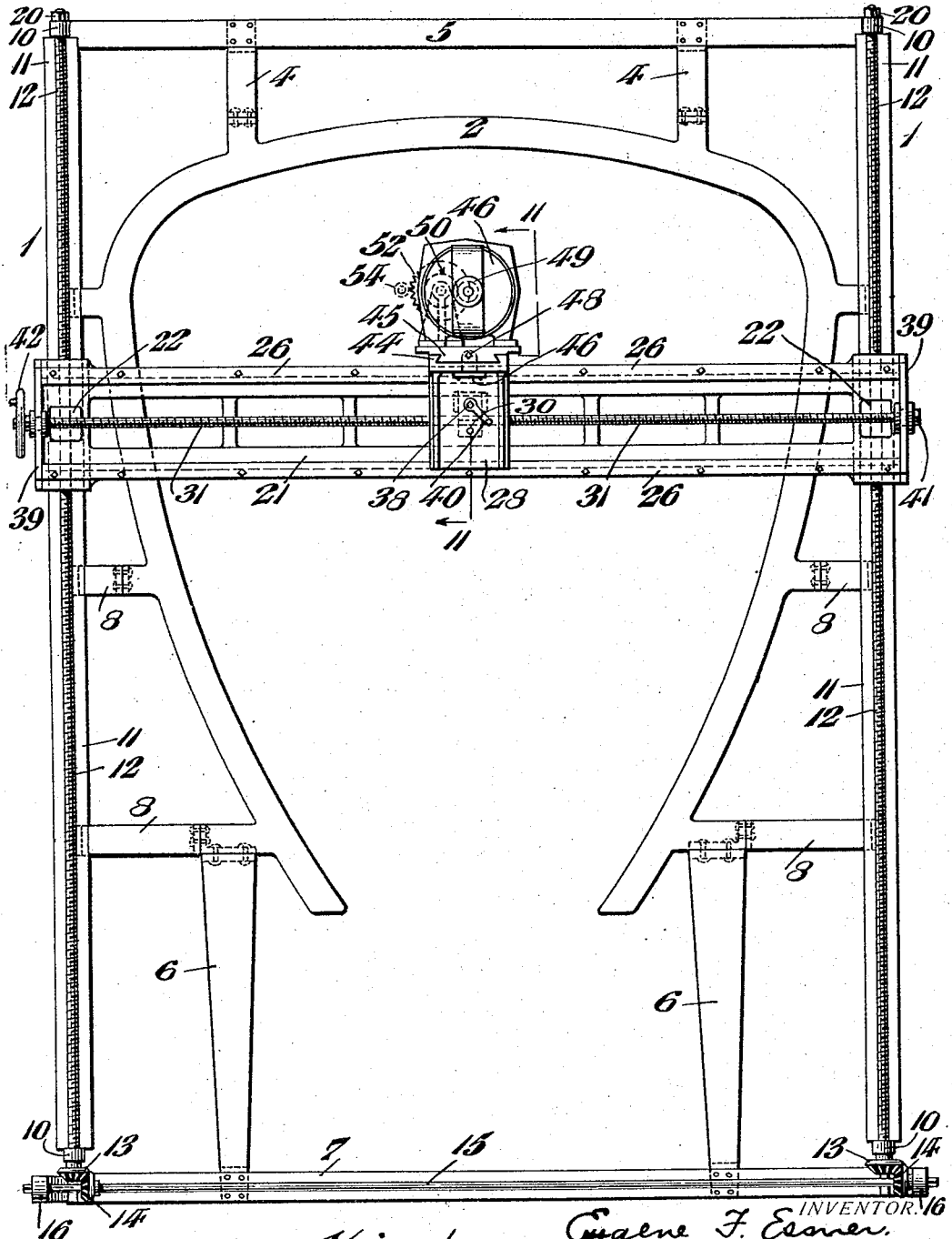
Figure 1 represents a front elevation of a machine for sawing off condenser tubes.

Referring to the drawings,

The machine is provided with a frame 1 of a size suitable for the work to be covered and adapted to the type of condenser operated upon. The frame has a body portion 2 conforming preferably to the shape of the condenser head and this frame is bolted or otherwise secured to the condenser head which is indicated in dotted lines in Fig. 2, as at 3. The body portion 2 is connected by means of plates 4 with an upper bar 5 and by means of plates 6 with a lower bar 7. The body portion 2 is connected by plates 8 with the uprights 9. By such construction a rigid skeleton frame is formed and the central portion is left free and unobstructed for the operation of the saw.

The uprights 9 carry at their upper ends the bearings 10 which are screwed into such uprights and are prevented from improper movement by means of plates 11 fixed to the front faces of the uprights. 12 designates vertically disposed screws, journaled in the bearings 10 and provided at their lower ends with gears 13 which mesh with gears 14 on a shaft 15 journaled in brackets 16 carried by the frame. The shaft 15 has a polygonal contour at one end to receive a ratchet 17 with which coöperates a spring pressed pawl 18 carried by the bifurcated end of a handle 19. The bifurcated end of the handle 19 is rotatable on the shaft 15, so that when the handle is actuated in the proper direction the pawl 18 engages with the teeth of the ratchet to effect the rotation of the shaft 15 and the screws 12 intergeared with it.

The screws 12 are provided at their upper ends with the nuts 20 which maintain such screws in assembled position with respect to the frame.

21 designates a cross rail which extends laterally across the frame and is preferably formed from a structural metal beam. At the ends of the cross rail 21 nuts 22 are provided with which the screws 12 are in threaded engagement and these nuts 22 are secured to the cross rail by means of fastening devices 23. The rail at each end is apertured to fit over the uprights or vertical guide rails 9 and it is provided with the slots 24, see Fig. 7, in which the plate 11 secured to the uprights 9 is adapted to slide, so that when the screws 12 are actuated the cross rail 21 and its adjuncts will be raised or lowered as desired. The cross rail 21 is provided on its front face with the outwardly extending flanges 25 to which are secured the plates 26 which engage the walls of the slots 27 of a carriage 28. The carriage 28 is provided with a block 29 fixed to it in any desired manner and as shown in Fig. 11 it is secured to such carriage by means of a set screw 30. The upper face of the block 29 is recessed to receive a feed screw 31, it being understood that the recessed portion of this block is smooth and unthreaded.

32 designates a nut which is provided on opposite sides with the vertically extending grooves 33 into which extend the keys 34 which are connected to flanges extending rearwardly from the carriage 28. The nut 32 is provided at its lower end with the threads 35 which open through the lower face of the nut. The nut 32 is provided with an elliptical shaped aperture 36 into which extends an eccentric 37, said eccentric being journaled in the carriage 28 and having its shank, which extends through the carriage, of a polygonal contour as indicated at 38 so that it is adapted to receive a wrench or the like 40 to adjust the position of the eccentric 37. The feed screw 31 is journaled in the plate 39 secured in any desired manner to the ends of the cross rail 21 and the end of the feed screw 31 is provided at one end with a nut 41 and at its opposite end with a hand wheel 42 which is adapted to be manually actuated in order to effect the lateral adjustment of the carriage 28.

The carriage 28 is provided with a table 43 having a key-way 44, see Fig. 1, to receive the base plate 45 of a motor 46 of any desired type and which would preferably be an electric motor. The table 43 of the carriage 28 has fixed to it in any desired manner a nut 46 which receives a feed screw 47 which is rotatably carried by the base plate 45 but is prevented from longitudinal movement with respect to it. The feed screw 47 at one end is provided with a polygonal contour, as at 48, in order to adapt it to receive a suitable wrench to effect the rotation of the feed screw 47. The shaft of the motor 46 has fixed to it a gear 49 which meshes with a gear 50 on an arbor 51 which is journaled in the frame of the motor. The arbor 51 has secured to its forward end a circular saw 52 which is secured in position by means of countersunk screws 53 so that the front face of the saw is unobstructed and the ends of the tubes 54 can be cut off as close as may be required. It will be seen that the motor drives the saw by means of a single reduction gear.

In the operation, the carriage 28 is laterally adjusted in order to position it with respect to the tube which is to be first cut. The cross rail 21 is vertically adjusted by means of the handle 19 which effects the rotation of the screws 12.

The saw 52 may be adjusted to cut off the condenser tube at any desired point by the proper actuation of the adjusting screw 48 which adjusts the in and out position of the motor and of the saw which it drives.

The carriage 28 may, when desired, be disconnected from its feed screw 31 by rotating the eccentric 37 to cause the feed nut 32 to be raised out of engagement with the feed screw 31. When the feed nut 32 is in mesh with the feed screw 31 and the handle 42 is rotated it will be apparent that the carriage and the motor will be adjusted so as to assume any desired position transversely of the condenser head.

In practice the operator cuts off the lower row of condenser tubes first and then actuates the handle 19 to progressively raise the cross rail 21 to bring it into operative position for the next upper row of condenser tubes.

When a machine constructed in accordance with my present invention is employed one is enabled to cut off the ends of the condenser tubes in a fraction of the time which has been deemed necessary when the tubes are cut off in the usual manner.

It will now be apparent that I have devised a novel and useful construction of a machine for cutting off condenser tubes which embodies the features of advantage enumerated as desirable in the statement of the invention and the above description, and while I have, in the present instance, shown and described preferred embodiments thereof which will give in practice satisfactory and reliable results, it is to be understood that such embodiments are susceptible of modification in various particulars without departing from the spirit or scope of the invention or sacrificing any of its advantages.

Having thus described my invention, what I claim as new and desire to secure by Letters Patent, is:—

1. In a device of the character stated, a laterally movable carriage, a motor mounted in said carriage, a motor shaft having a gear thereon, a saw arbor, having a pinion thereon in mesh with said gear, a circular saw secured to the forward end of said arbor and having its front surface unobstructed for the purpose specified, and means to feed said motor and saw as a unit in a direction at substantially right angles to the line of movement of said carriage.

2. In a device of the character stated, a carriage, a motor mounted on said carriage, a motor shaft having a gear thereon, a saw arbor having a pinion thereon, in mesh with said gear, a circular saw secured to the forward end of said arbor, means for adjusting said carriage vertically, and means for adjusting said carriage horizontally.

3. In a device of the character stated, a carriage, a motor mounted on said carriage, a motor shaft having a gear thereon, a saw arbor having a pinion thereon in mesh with said gear, a circular saw secured to the forward end of said arbor, means for adjusting said carriage vertically, and means for adjusting said carriage horizontally, in combination with means for moving said carriage, motor and saw toward or away from the work.

4. In a machine of the character stated, a frame, a cross rail carried by it, means to effect the vertical adjustment of said cross rail, a carriage mounted on said cross rail, means to feed said carriage laterally upon said cross rail, a motor on said carriage, means to feed said motor on said carriage at substantially right angles to the line of movement of said carriage, and a saw driven by said motor.

5. In a machine of the character stated, a frame, a cross rail carried by it, means to effect the vertical adjustment of said cross rail, a carriage mounted on said cross rail, means to feed said carriage laterally upon said cross rail, a motor on said carriage, and a saw driven by said motor, in combination with means for moving said motor and saw toward or away from the work.

6. In a machine of the character stated, a frame having a body portion conforming to the shape of the article to which it is to be secured, a cross rail movable on said frame, means to effect the vertical adjustment of said cross rail, a carriage on said cross rail and means to laterally adjust said carriage on said cross rail, a motor on said carriage adjustable toward or away from the work, and a circular saw driven by said motor.

7. In a machine of the character stated, a frame having a body portion, vertical guide rails on the opposite sides of said frame, feed screws journaled in said guide rails, a manually actuated shaft intergeared with said feed screw, a cross rail mounted on said guide rails and intergeared with said feed screw, a carriage on said cross rail, means to feed said carriage along said cross rail, and a motor driven saw mounted on said carriage.

8. In a machine of the character stated, a frame, vertical guide rails on said frame, a horizontal cross rail vertically slidable on said vertical guide rails, nuts carried by said rails, feed screws engaging said nuts, means to simultaneously actuate said screws to effect the vertical adjustment of said cross rail, a feed screw mounted in said cross rail, a carriage laterally movable on said cross rail, a nut carried by said carriage and having its threads opening through a wall thereof, and an eccentric on said carriage to move said nut into and out of operative relation with respect to said feed screw.

9. In a machine of the character stated, a frame, vertical guide rails on said frame, a horizontal cross rail vertically slidable on said vertical guide rails, nuts carried by said rails, feed screws engaging said nuts, means to simultaneously actuate said screws to effect the vertical adjustment of said cross rail, a feed screw mounted in said cross rail, a carriage laterally movable on said cross rail, a nut carried by said carriage, and having its threads opening through a wall thereof, an eccentric on said carriage to move said nut into and out of operative relation with respect to said feed screw, and a motor driven circular saw mounted on said carriage.

10. In a machine of the character stated, a skeleton frame adapted to be attached to an end of a condenser or the like, a motor carriage adjustably supported with respect to said frame, means for raising and lowering said motor carriage, means for adjusting said motor carriage laterally, a motor supported on said carriage, a motor shaft, a gear on said shaft, a saw arbor mounted in a bearing on said carriage, a pinion on said arbor in mesh with said gear, a circular saw secured to the forward end of said arbor and having its front surface unobstructed, and means for moving said motor, arbor and saw as a unit toward or away from the work.

11. In a machine of the character stated, a motor carriage, a motor mounted therein, a motor shaft, a gear thereon, a saw arbor, a pinion thereon in mesh with said gear, a circular saw mounted on said arbor and having its forward surface unobstructed, and means for moving said carriage, motor and saw as a unit laterally with respect to the work, and means to feed said motor on said carriage in a direction at substantially right angles to the line of lateral movement of said carriage.

12. In a machine of the character stated, a motor carriage, a motor mounted therein, a motor shaft, a gear thereon, a saw arbor, a pinion thereon in mesh with said gear, a circular saw mounted on said arbor and having its forward surface unobstructed, and means for moving said carriage, motor and saw as a unit toward or away from the work, in combination with means for raising and lowering said motor carriage.

13. In a machine of the character stated, a motor carriage, a motor mounted therein, a motor shaft, a gear thereon, a saw arbor, a pinion thereon in mesh with said gear, a circular saw mounted on said arbor and having its forward surface unobstructed, means for moving said carriage, motor and saw as a unit toward or away from the work, means for raising and lowering said motor carriage, and means for laterally moving said motor carriage.

14. In a machine of the character stated, a skeleton frame having top and bottom and side members, vertical feed screws at each side of said frame having their upper and lower ends mounted in suitable bearings, means for simultaneously actuating said feed screws, a cross rail mounted on said feed screws and actuated thereby, a horizontal feed screw carried by said cross rail, a carriage horizontally movable on said cross rail and actuated by said horizontal feed screw, means for disconnecting said carriage from said feed screw, a motor carriage mounted on said horizontally movable carriage, and movable transversely thereof, a motor on said carriage, a saw arbor also mounted on said carriage, gearing intermediate said motor and saw arbor for rotating the latter, and a circular saw mounted on said saw arbor.

EUGENE FRANCIS ESSNER.

Witnesses:
MAURICE ASHER,
A. W. STIDSTON.